United States Patent [19]

Snyman

[11] Patent Number: 4,630,732
[45] Date of Patent: Dec. 23, 1986

[54] STORAGE DEVICE FOR STORING DISC-SHAPED ARTICLES

[76] Inventor: Robert Snyman, 1180 Pretorius Street, Hatfield, Pretoria, Transvaal Province, South Africa

[21] Appl. No.: 769,574

[22] Filed: Aug. 26, 1985

[30] Foreign Application Priority Data

Sep. 6, 1984 [ZA] South Africa ............... 84/7013

[51] Int. Cl.⁴ ............................................. A47B 81/06
[52] U.S. Cl. ................................... 206/445; 206/309; 206/444; 211/40; 312/17
[58] Field of Search ............... 206/309, 444, 303, 445; 211/40, 41; 312/8-19

[56] References Cited

U.S. PATENT DOCUMENTS

| | | | |
|---|---|---|---|
| 1,026,111 | 5/1912 | Nichols | 312/17 |
| 1,066,138 | 7/1913 | Nichols | 312/17 |
| 1,258,498 | 3/1918 | Stuebing, Jr. et al. | 312/18 |
| 1,337,812 | 4/1920 | Allen | 312/17 |
| 2,402,044 | 1/1946 | Heckman | 312/17 |
| 2,944,859 | 7/1960 | Ivanoff | 312/15 |
| 4,519,655 | 5/1985 | Kamperman | 312/12 |

FOREIGN PATENT DOCUMENTS

| | | | |
|---|---|---|---|
| 0672829 | 11/1965 | Belgium | 312/17 |
| 0620996 | 5/1927 | France | 312/15 |
| 0017891 | of 1913 | United Kingdom | 312/17 |

*Primary Examiner*—William Price
*Assistant Examiner*—Jimmy G. Foster
*Attorney, Agent, or Firm*—Ladas & Parry

[57] ABSTRACT

A storage device for storing a plurality of disc-shaped articles, or discs includes a support having a support surface for supporting the discs. The support includes bias means to bias the discs towards rolling along the support. The device further includes releasable restraining means to restrain the discs against rolling under the effect of the bias means. In one embodiment of the invention, the support surface of the support includes a sloping portion which provides the bias means in the form of a gravity bias. In another embodiment of the invention, the support includes a hinged portion pivotally mounted on a floor of the device, and the bias means is a spring bias acting between the floor and the hinged portion.

6 Claims, 10 Drawing Figures

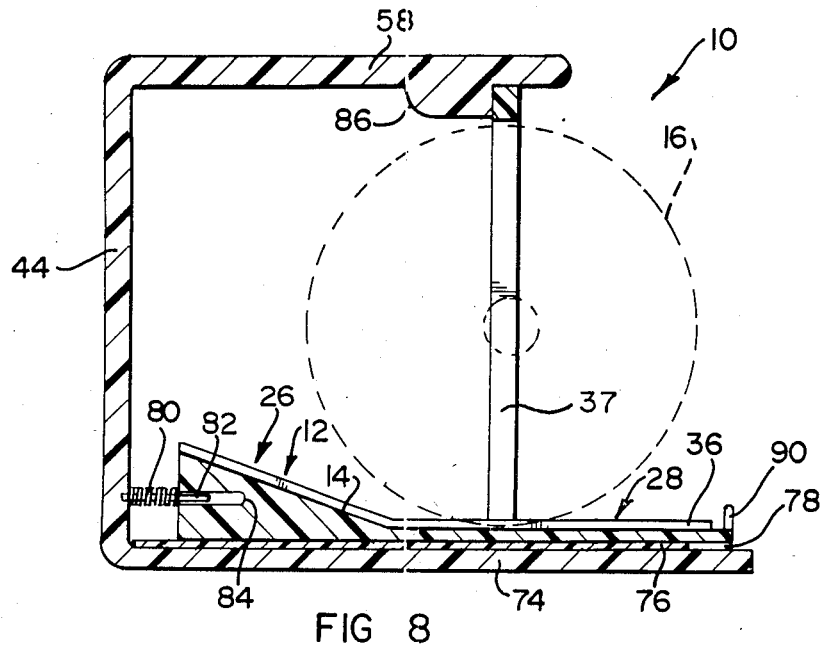

STORAGE DEVICE FOR STORING DISC-SHAPED ARTICLES

FIELD OF THE INVENTION

This invention relates to a storage device. More particularly, it relates to a storage device for storing a plurality of disc-shaped articles such as compact disc, in closely spaced side-by-side relationship.

BACKGROUND OF THE INVENTION

Normally compact disc are stored in plastics cases having hinged lids. To play a number of tracks from a number of different discs sequentially, entails opening and closing a number of these cases to remove or store the discs. Alternatively, the discs are left lying around.

It is an object of this invention to provide a storage device for storing, and retrieving, a plurality of disc-shaped articles which the Applicant believes will alleviate these problems at least to some extent.

SUMMARY OF THE INVENTION

According to the invention, there is provided a storage device for storing a plurality of disc-shaped articles in closely spaced vertical side-by-side relationship which includes a support having a support surface for supporting disc-shaped articles, the support including bias means in use to bias the articles towards rolling; and releasable restraining means to restrain the articles against rolling under the effect of the bias means.

According to one embodiment of the invention, the support surface may include a sloping portion providing the bias means in the form of a gravity bias, to allow the articles in use to roll down the sloping portion on release of the restraining means.

The support surface may include a substantially horizontal portion extending away from the foot of the sloping portion, a stop being provided at or near the end of the horizontal portion to prevent the article, in use, from rolling off the end of the horizontal portion of the support surface.

The device may include a plurality of restraining means, one for each article to be stored, release of one of the restraining means in use, allowing the article associated with that restraining means to roll down the sloping portion, while the remaining articles are retained in position on their respective sloping portions.

Each restraining means may include a lever having a shoe, the lever being biased to cause the shoe to bear frictionally against the periphery of the article. The shoe may have a slot to accomodate a part of the periphery of the disc-shaped article.

Instead of the restraining means being in the form of levers, the device may include a plurality of supports, one for each article to be stored. The device may include a floor and a rear wall extending upwardly from the floor, each support being slidably mounted on the floor, and the restraining means may then include bias means to bias the support away from the rear wall of the device, the restraining means further including a shoulder at an upper portion of the front of the device against which a part of the periphery of the article abuts in use.

According to another embodiment of the invention, the device may include a plurality of supports, each support including a hinged portion pivotally mounted on a floor of the device, and the bias means may be a spring bias acting between the floor and each hinged portion of the support.

The device may include a plurality of restraining means, one for each article to be stored, release of one of the restraining means in use allowing the support associated with that article to pivot about its pivotal axis under the effect of the spring bias to urge the article out of the device.

Each restraining means may include a lever pivotally mounted at an upper portion of the front of the device, the lever including a shoe which is biased to bear frictionally against the periphery of the device.

In both embodiments of the invention, the device may include guide means for each of the articles. Each guide means may include a groove which extends along the support, the periphery of the disc being rollably receivable within the groove.

The device may include a vertical slot aligned with each groove at an upper portion of the front of the device to facilitate the insertion of each disc-shaped article into, and its removal from the device.

BRIEF DESCRIPTION OF THE DRAWINGS

The invention will now be described by way of example with reference to the accompanying diagrammatic drawings.

In the drawings,

FIG. 8 shows a sectional side elevation of the device of FIG. 7 after the release of the restraining means;

FIG. 9 shows a sectional side elevation of yet another embodiment of the device.

DETAILED DESCRIPTION OF THE DRAWINGS

Figure 1:
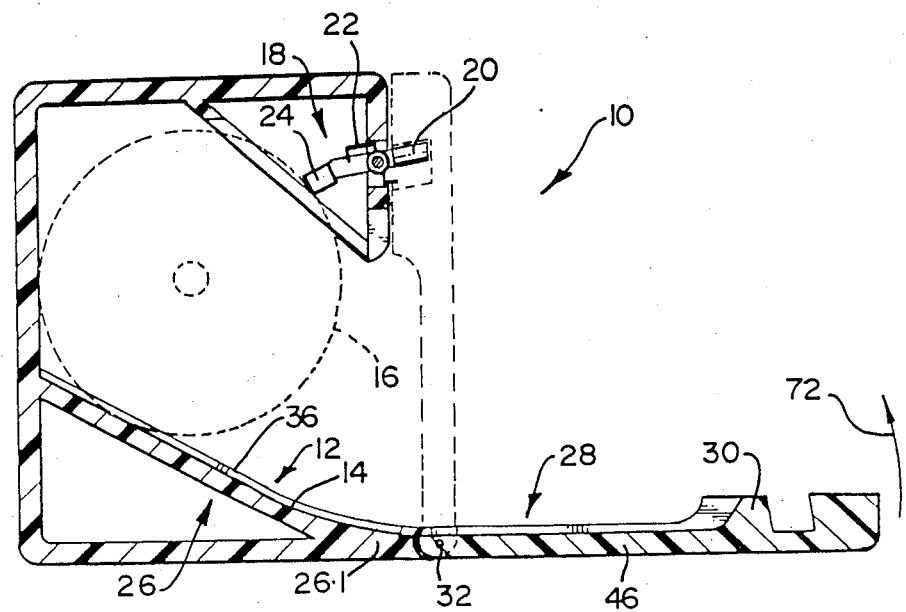
FIG. 1 shows a sectional side elevation of a storage device in accordance with one embodiment of the invention taken at I—I in FIG. 3.
Figure 2:
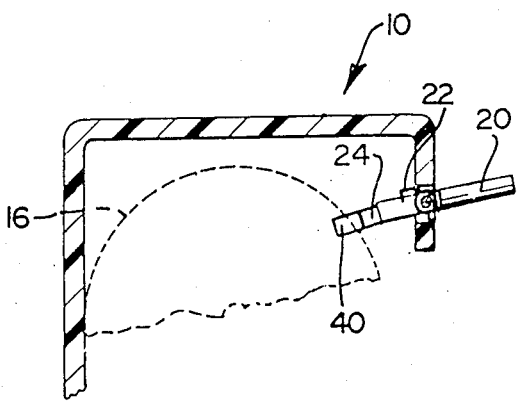
FIG. 2 shows a sectional side elevation of a portion of another embodiment of the device.
Figure 3:
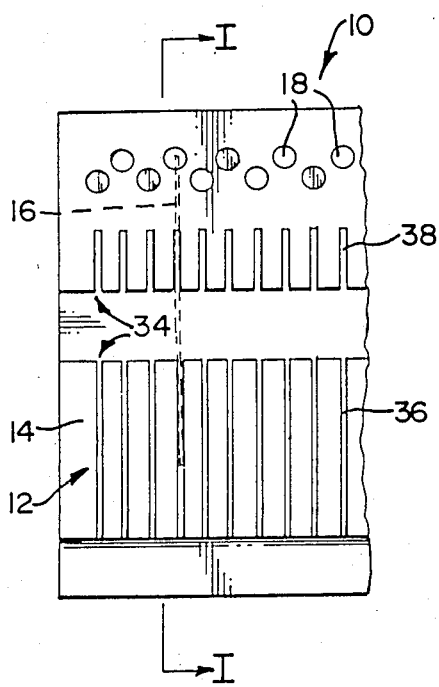
FIG. 3 shows a front view of part of the device of FIG. 1.

Referring to FIGS. 1 TO 3, a storage device, in accordance with the invention, for storing a plurality of disc-shaped articles in closely spaced vertical side-by-side relationship is designated generally by the reference numeral 10. The device 10 includes a support 12 having a support surface 14 for supporting disc-shaped articles 16. The support 12 including bias means in use to bias the articles 16 towards rolling. The device 10 further includes releasable restraining means 18 to restrain the articles 16 against rolling under the effect of the bias means.

The disc-shaped articles 16 are compact discs (referred to simply as a disc hereafter.) As shown in FIG. 3, each disc 16 has its own restraining means 18. Each restraining means 18 includes a pivotally mounted lever 20 biased to the restraining position by means of a spring 22. Each lever 20 further includes a shoe 24 for engaging a part of periphery of the disc 16.

The support surface 14 includes a sloping portion 26. the sloping portion 26 provides the bias means in the form of a gravity bias to allow the discs 16 in use to roll down the sloping portion 26 on release of the restraining means 18. The support surface 14 further includes a substantially horizontal portion 28 extending from the foot 26.1 of the sloping portion 26. A stop 30 is provided at or near the end of the horizontal portion 28 to prevent the disc 16 from rolling off the end of the horizontal portion 28 of the support surface 14, in use.

The horizontal portion 28 of the support surface 14 is hinged at 32 to serve as a door 46 to close off the front of the device 10.

The device 10 includes guide means 34 (FIG. 3) for each of the discs 16. Each guide means 34 includes a groove 36 extending along the support surface 14, the periphery of the disc 16 being rollably receivable within the groove 36. A vertical slot 38, aligned with each groove 36 is provided below the lever 20 to facilitate the insertion of a disc 16 into, and its removal from the device 10.

If other disc-shaped articles having surfaces prone to scratching, such as long playing records, are to be stored in the device 10, each groove 34 and slot 36 can be lined with a non-scratch material such as velvet.

In the embodiment shown in FIG. 2, the shoe 24 of the lever 20 includes a slot 40 within which the periphery of the disc 16 is receivable.

Figure 4:
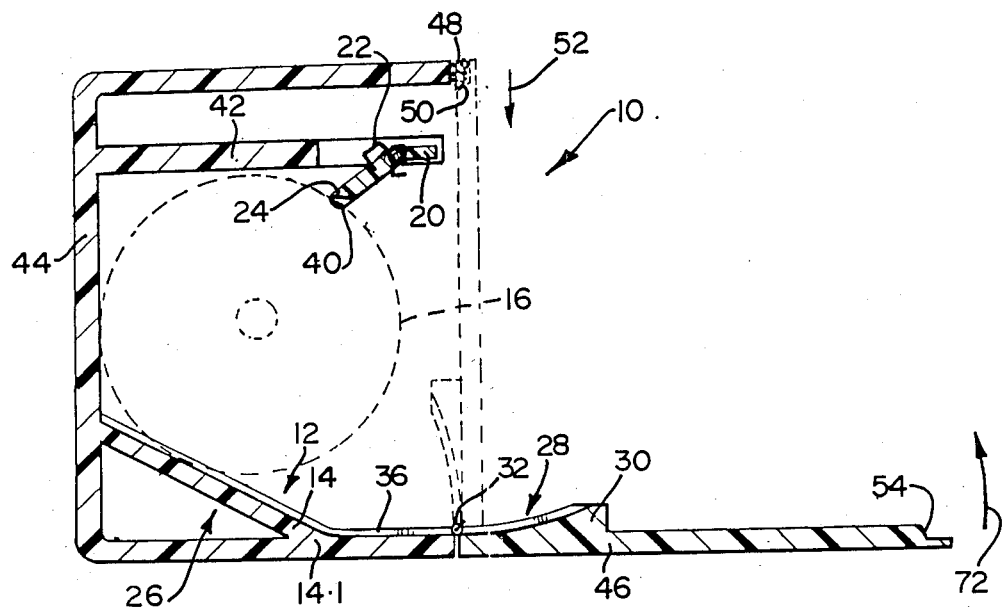
FIG. 4 shows a sectional side elevation of a further embodiment of the device taken at IV—IV in FIG. 5.
Figure 5:
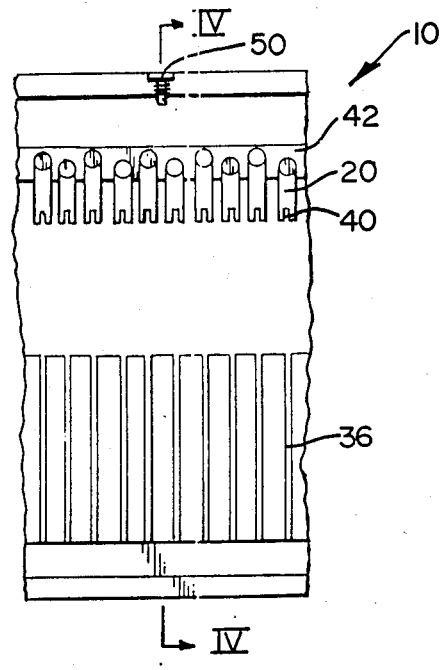
FIG. 5 shows a front view of part of the device of FIG. 4.

Referring now to FIGS. 4 and 5 another embodiment of the device 10 is shown. With reference to FIGS. 1 TO 3, like reference numerals refer to like parts unless otherwise specified.

In this embodiment a shelf 42 is provided which projects cantilever-fashion from a rear wall 44 of the device 10, above the storage space for the discs 16. The shelf 42 provides storage space for booklets (not shown) which are normally provided with the compact discs 16. The lever 20, including a slot 40 cut into its shoe 24, similar to that shown in FIG. 2 is mounted on the shelf 42, near the free end thereof.

The stop 30 is mounted close to the pivot axis of a hinged front portion forming a door 46 of the device 10. A spring biased pin 48 is mounted at the front of the device 10. The pin 48 has a chamfered tip 50 which co-operates with a sloping portion 54 of the end of the door 46. By pressing downwardly on the pin 48 against the action of the spring bias in the direction of arrow 52, the door 46 can be opened.

Figure 6:
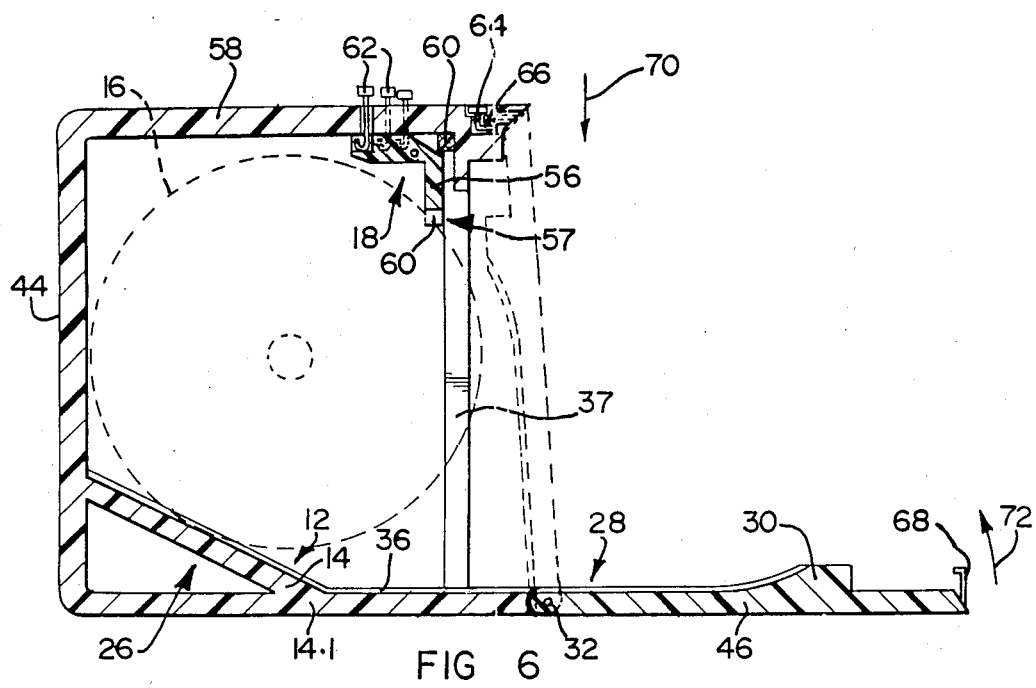
FIG. 6 shows a sectional side elevation of still a further embodiment of the device.

Referring now to FIG. 6 yet another embodiment of a device in accordance with the invention is shown. With reference to the previous drawings, like reference numerals refer to like parts unless otherwise specified.

In this embodiment the releasable restraining means 18 is in the form of an L-shaped lever 56 pivotally mounted below a top wall 58 of the device 10. Each lever 56 includes a slot 60 in its limb projecting vertically downwardly, within which part of the periphery of the disc 16 is receivable. The lever 56 is resiliently biased so that the limb including the slot projects vertically downwardly. The resilient bias of the lever 56 is provided by means of a block of elastomeric material such as rubber 60 mounted between a chamfered outer corner of the L-shaped lever 56 and the top wall 58. The lever 56 is operable by means of a button 62 projecting through the top wall 58 of the device 10.

A spring-biased pin 64 is mounted near the end of the front wall 58 of the device 10. The pin 64 has a catch 66 which co-operates with a complementary catch 68 of the door 46. By pressing downwardly on the pin 64 in the direction of arrow 70, the door 46 can be opened.

Vertical posts 37 are provided near the front of the device 10 on either side of each of the grooves 36 to define vertical slots, aligned with the grooves 36, through which the discs 16 are rollable in use. The slot facilitates the alignment of the disc 16 in the groove 36.

In use, to store a disc 16 in any one of the devices 10 of the embodiment shown in FIGS. 1 to 6, the periphery of the disc 16 is inserted into the groove 36 extending along the horizontal portion 28 of the support 12. As the disc 16 is rolled up the sloping portion 26 of the support surface 14 it bears against the shoe of the lever 20 or 56 and acts against the bias means of the lever 20 or 56 to pivot the lever out of the way. The biasing force causes the shoe 24 or 57 to follow the curve of the periphery of the disc 16. When the disc 16 abuts against the rear wall 44 of the device 10, the shoe 24 or 57 of the lever 20 or 56 respectively, abuts against the periphery of the disc thereby retaining the disc 16 in position on the sloping portion 26 of the support 12. The device 10 is then closed by pivoting the door 46 about the pivot axis of the hinge 32 in the direction of arrow 72, so that it is in a position shown by the dotted lines in FIGS. 1, 4 and 6.

To release a disc 16 from the device 10 the door 46 is opened and the lever 20 or the button 62 of the lever 56 is depressed. The disc 16 then simply rolls down the sloping portion 26 along the horizontal portion 28 under the action of gravity and will come to rest against the stop 30.

Figure 7:
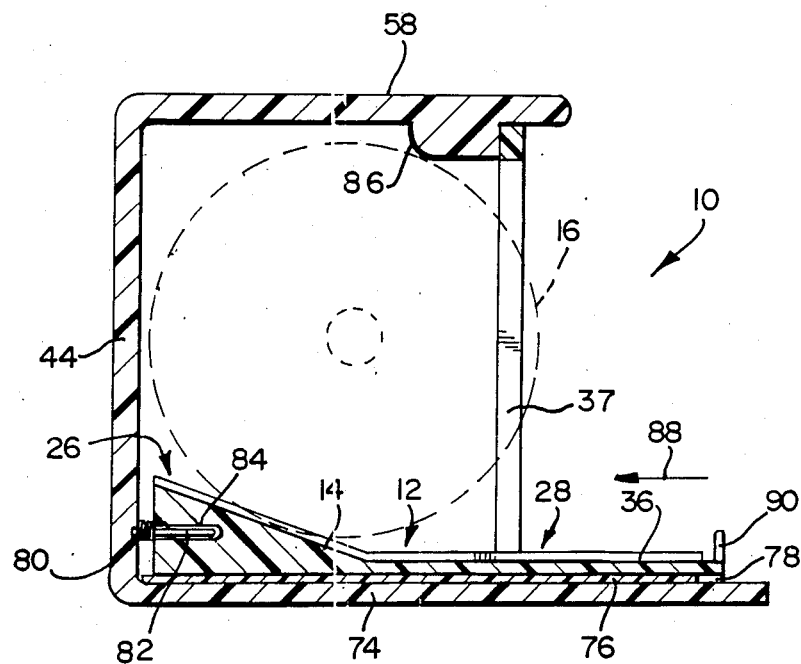
FIG. 7 shows a sectional side elevation of a yet a further embodiment of the device.

Referring now to FIG. 7 a device for storing disc shaped articles in accordance with yet another emobodiment of the invention is shown.

In this embodiment the device 10 includes a plurality of supports 12, one for each disc 16 to be stored.

Each support 12 is slidably mounted on a floor 74 of the device 10. Each support 12 slides on a rib 76 projecting from the floor 74. The rib 76 is receivable within a complementary groove 78 in the bottom of the support 12.

The restraining means includes bias means in the form of a coil spring 80 to bias the support 12 away from the rear wall 44 of the device 10. The coil spring 80 is coaxially mounted on a pin 82 projecting from the rear wall 44 of the device 10 into a complementary bore 84 at the rear of the support 12. The pin 82 serves as a guide for the coil spring 80 and the support 12. The restraining means further includes a shoulder projecting downwardly from the top wall 58, near the front of the top wall 58. In use, part of the periphery of the disc 16 abuts against the shoulder 86 to retain the disc in position on the sloping portion 26 of the support 12.

In use, to insert a disc 16 into the device 10, it is placed in the slot 36 extending along the horizontal portion 28 of the support 12 and is then rolled up the sloping portion 26 of the support 12 against the action of the spring 80. This urges the support 12 towards the rear wall 44 and the disc 16 is retained in position by means of the shoulder 86. To remove a disc 16 from the device 10, the support 12 is urged in the direction of arrow 88 against the action of the spring 80. That portion of the periphery of the disc 16 which abuts against the shoulder 86 is then disengaged from the shoulder 86 and rolls down the sloping portion 28 of the support 12 along the horizontal portion 28, as shown in FIG. 8, under the effect of gravity. To facilitate urging the support 12 against the spring 80, an upwardly projecting lug 90 is provided at the end of the support 12 opposite the bore 84. The support 12 can thus be moved by pressing on the lug 90 in the direction of arrow 88. The lug 90 further serves as a stop to prevent the disc 16 rolling off the edge of the support 12.

Figure 10:
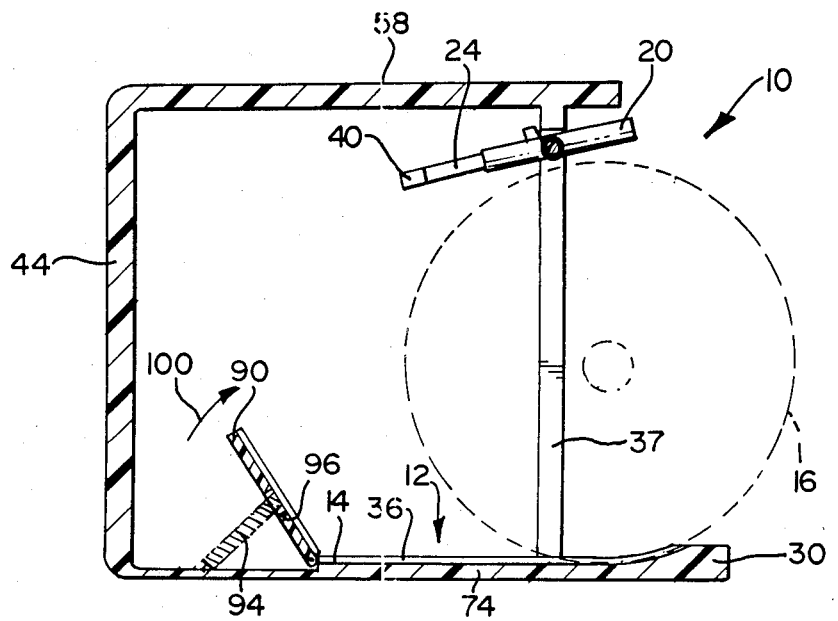
FIG. 10 shows a sectional side elevation of the device of FIG. 9 after the release of the restraining means.

Referring now to FIGS. 9 and 10 still another embodiment of the device is shown.

In this embodiment, the device 10 includes a plurality of supports 12, one for each disc 16 to be stored. Each support 12 includes a hinged portion 90 pivotally mounted at 92 on the floor 74 of the device 10. The bias means of the support 12 is a spring 94 (shown more clearly in FIG. 10) which acts between the floor 74 and the bottom of the hinged portion 90.

To permit the hinged portion 90 to lie substantially flush with the floor 74, the bottom of the hinged portion 90 includes a recess 96 within which the spring is receivable when it is in its compressed condition.

As in the case of the embodiment described with reference to FIGS. 1 to 5, the restraining means 18 includes a pivotally mounted lever 20 biased to its restraining position by means of a spring 22. The lever 20 includes a slot 40 in its shoe 24 within which a part of the periphery of the disc 16 is receivable.

The spring 22 is selected so that it has a stronger bias action than the bias action of the spring 94 so that the lever 20 will restrain the disc in position on the support 12, against the bias action of the spring 94.

In use, to store a disc 16 in the device 10, the periphery of the disc 16 is inserted in the groove 36 and is urged into the device 10 against the action of the spring 94. As the disc 16 is rolled along the groove 36, its periphery abuts against the hinged portion 90, urging it downwardly towards the floor 74 against the bias action of the spring 94. Thus when the periphery of the disc abuts against the rear wall 44, the hinged portion 90 will lie substantially flush with the floor 74. A part of the periphery of the disc 16 will then be received within the slot 40 of the shoe 24 of the lever 20, which will restrain the disc 16 against rolling along the support 12, under the bias action of the spring 94.

To release a disc 16 from the device 10, the lever 20 is pivoted in the direction of arrow 98. This allows the spring 94 to extend causing the hinged portion 90 to pivot about the pivot axis of the hinge 92 in the direction of arrow 100 (FIG. 10). The hinged portion 90 thereby urges the disc 16 out of the device 10 along the support 12.

What is claimed is:

1. A storage device for storing a plurality of disc-shaped articles in closely spaced vertical side-by-side relationship which includes
    a floor and a rear wall extending upwardly from the floor; a plurality of supports, each being slidably mounted on the floor, one support being provided for each article to be stored, each support having a support surface for supporting the articles, and including first bias means for biasing the articles towards rolling; and
    releasable restraining means associated with each support to restrain the articles against rolling under the effect of the first bias means, each restraining means including second bias means to bias its associated support away from the rear wall or the device, and a shoulder at an upper portion of the front of the device against which a part of the periphery of the article abuts in use.

2. A device as claimed in claim 1 in which each support surface includes a sloping portion providing the first bias means in the form of a gravity bias to allow the article supported on that support surface, in use, to roll down the sloping portion on release of the restraining means associated with that support.

3. A device as claimed in claim 2 in which each support surface includes a substantially horizontal portion extending away from the foot of the sloping portion, a stop being provided at or near the end of the horizontal portion to prevent the article, in use, from rolling off the end of the horizontal portion of the support surface.

4. A device as claimed in claim 1 which includes guide means for each of the articles to be supported.

5. A device as claimed in claim 4 in which each guide means includes a groove which extends along each support, the periphery of the disc article being rollably receivable in the groove.

6. A device as claimed in claim 1 in which the second bias means includes a coil spring acting between the rear wall of the device and a rear portion of the support, the coil spring being co-axially mounted on a pin projecting from the rear wall of the device into a complementary bore in the rear of the support.

* * * * *